(12) United States Patent
Sieverding

(10) Patent No.: US 9,886,586 B2
(45) Date of Patent: Feb. 6, 2018

(54) METHOD FOR REQUESTING A CLOSURE OF A TRACK SECTION AND A CLOSURE REVOCATION AND ASSEMBLY HAVING A COMMUNICATION DEVICE ON A TRACK SECTION

(71) Applicant: SIEMENS AKTIENGESELLSCHAFT, Munich (DE)

(72) Inventor: Peter Sieverding, Vechelde (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/902,522

(22) PCT Filed: Jun. 10, 2014

(86) PCT No.: PCT/EP2014/061995
§ 371 (c)(1),
(2) Date: Dec. 31, 2015

(87) PCT Pub. No.: WO2015/000662
PCT Pub. Date: Jan. 8, 2015

(65) Prior Publication Data
US 2016/0371497 A1    Dec. 22, 2016

(30) Foreign Application Priority Data
Jul. 2, 2013  (DE) .................. 10 2013 212 849

(51) Int. Cl.
*H04L 29/06*    (2006.01)
*G06F 21/60*    (2013.01)
(Continued)

(52) U.S. Cl.
CPC ............. *G06F 21/606* (2013.01); *B61L 7/06* (2013.01); *B61L 19/06* (2013.01); *B61L 23/00* (2013.01);
(Continued)

(58) Field of Classification Search
CPC .. G06F 21/606; G06F 2221/2153; B61L 7/06; B61L 19/06; B61L 23/00; B61L 23/06
See application file for complete search history.

(56) References Cited

U.S. PATENT DOCUMENTS

| 8,788,837 B2 | 7/2014 | Busch et al. |
| 2009/0143928 A1* | 6/2009 | Ghaly ................. B61L 19/06 701/19 |

(Continued)

FOREIGN PATENT DOCUMENTS

| CN | 102111611 A | 6/2011 |
| DE | 19508731 A1 | 8/1996 |

(Continued)

OTHER PUBLICATIONS

RedTeam Presenting GmbH, Man-in-the-Middle Attacks against the chipTAN comfort Online Bancking System, Nov. 23, 2009, pp. 1-9.*

*Primary Examiner* — Ghodrat Jamshidi

(57) ABSTRACT

A method for requesting a closure of a track section and a closure revocation by way of a closure signal sent by a communication device, having a monitor on the track section, to a signal box and by way of a sent closure revocation signal. In order to render such a method more secure, the sent signals are secured by way of a secure computer module that can be optically coupled to the monitor, and a signal box is used which is expanded in such a way that the signal box detects the sent and secured signals and sends confirmation signals to the secure computer module. There is also pro- (Continued)

vided an assembly with a communication device having a monitor on a track section.

2 Claims, 1 Drawing Sheet

(51) Int. Cl.
  *B61L 23/00* (2006.01)
  *B61L 19/06* (2006.01)
  *B61L 23/06* (2006.01)
  *B61L 7/06* (2006.01)
(52) U.S. Cl.
  CPC ...... *B61L 23/06* (2013.01); *G06F 2221/2153* (2013.01)

(56) References Cited

U.S. PATENT DOCUMENTS

2010/0163687 A1 7/2010 Brand et al.
2012/0297464 A1* 11/2012 Busch ................ G06F 11/1008
 726/5

FOREIGN PATENT DOCUMENTS

| DE | 102009055947 A1 | 6/2011 |
|----|----|----|
| GB | 803114 | 10/1958 |
| KR | 101272897 B1 | 6/2013 |

* cited by examiner

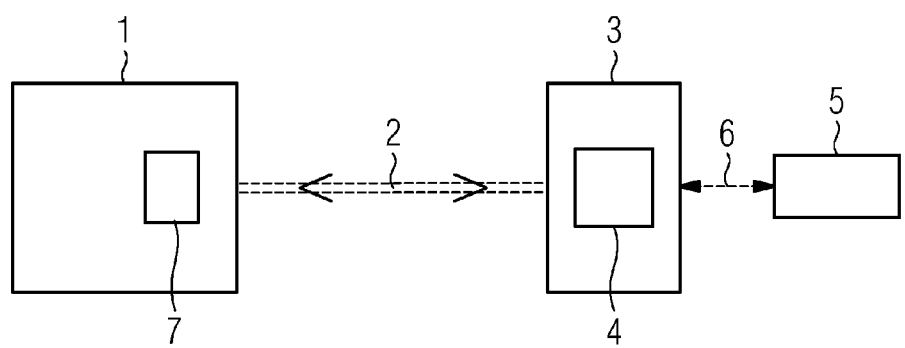

METHOD FOR REQUESTING A CLOSURE OF A TRACK SECTION AND A CLOSURE REVOCATION AND ASSEMBLY HAVING A COMMUNICATION DEVICE ON A TRACK SECTION

BACKGROUND OF THE INVENTION

Field of the Invention

The invention relates to a method for requesting a closure of a track section and a closure revocation by means of closure signal sent by means of a communication device having a monitor on the track section to an interlocking and by means of a sent closure revocation signal.

In a known, long-practiced method of this type a telephone is used as the communication device, with which for example a closure signal for the track section is transferred in the form of a telephone call to the operations center of the interlocking responsible by a maintenance gang sent out to do repair work at the track section for example, in order to obtain a closure of the track section for rail traffic. Unless there are reasons for not doing so, the track section is closed by the operations center of the interlocking and this closure is confirmed to the maintenance gang by telephone. A similar procedure is used for the closure revocation, i.e. the withdrawal of the closure. In this method non-secure components are used throughout and security is only created via procedural security. Ultimately communication is only conducted with confirmation by voice. This even applies if, in a contemporary context, a communication device with a monitor is used, such as a smartphone for example.

BRIEF SUMMARY OF THE INVENTION

The underlying object of the invention is to design the known method to be more secure.

To achieve this object, in a method of the type specified above, in accordance with the invention the sent signals are secured by means of a secure computer chip able to be coupled optically to the monitor and an interlocking, expanded in such a way that it recognizes the sent and secured signals and sends the confirmation signals to a secure computer chip, is used.

A major advantage of the inventive method is seen as its ability to guarantee, as a result of the secure computer chip able to be coupled optically to the monitor and the expanded interlocking, a secure transmission of the closure signal— and also of the closure revocation signal. A further advantage is that the closure and the closure revocation need comparatively less time and money. In addition the inventive method offers the advantage that, in the case of pre-announced repair and/or maintenance work on the track section, the closure and the closure revocation can be undertaken automatically on the interlocking side because of the sent and secured signals.

Interlockings expanded in different ways can be used in the inventive method, provided they are just capable of interacting with the secure computer chip. It is seen as especially advantageous for an expanded interlocking with a module as a type of chipTAN server to be used as the interlocking, and for a computer unit as a type of chipTAN generator to be used as the secure computer chip. In this case relatively little adaptation work is needed in order to be able to use these components, introduced for Internet banking, in the inventive method.

The invention also relates to an assembly with a communication device with a monitor on a track section, which is connected via a communication link to an interlocking for transmission of a closure signal and a closure revocation signal.

Such an assembly is used in the known method discussed at the start.

In order to design the known assembly to be more secure in respect of its transmission characteristics, in accordance with the invention a secure computer chip is able to be coupled optically to the monitor and the interlocking is expanded such that that it detects the closure signal and the closure revocation signal and sends confirmation signals to the secure computer chip.

By analogy, this assembly has the same advantages as are given above for the inventive method.

The inventive assembly is especially advantageous when the expanded interlocking has a module in the manner of a chipTAN server and the secure computer chip is a computer unit in the manner of a chipTAN generator.

For further explanation of the invention an exemplary embodiment of an inventive assembly for carrying out the inventive method is shown in the FIGURE.

BRIEF DESCRIPTION OF THE DRAWING

The FIGURE shows a schematic diagram of an interlocking 1, to which a communication device 3 with a monitor 4 is able to be connected via a communication link 2. The communication link 2 can be a radio connection or an Internet connection for example, and the communication device can be embodied as a smartphone or as a tablet computer for example.

DESCRIPTION OF THE INVENTION

As can also be seen from the FIGURE, a secure computer chip 5, which is designed in the manner of a chipTAN generator, belongs to the assembly shown. ChipTAN generators have now become relatively widespread, because they are use by many bank customers in Internet banking in order to be able to conduct banking business securely over the Internet. The computer chip 5 as a chipTAN generator is able to be activated by means of a chip card handed out individually to an authorized person and is able to be optically coupled via an optical coupling point 6 to the monitor 4 in a way known from the use of a chipTAN generator; the computer chip 3 is thus held in front of the monitor 4 during its use at the position marked electronically there.

This handling of the secure computer chip 5 is only expedient if the interlocking 1 or its module 7 in the manner of a chipTAN server have been selected via the communication link 2 by the communication device 3 and a closure signal has been transmitted. If the module 7 recognizes both the communication device 3 as an authorized communication device and also the closure signal as in order, then a pictogram or a bar code is shown on the monitor 4 as information at the electrically-marked position.

This information is detected by the secure computer chip 5 and is converted into an authentication signal. Thereafter a confirmation signal is displayed on the secure computer chip 5, with which closure of the track section in response to the sent closure signal is confirmed.

If it is stored beforehand in the interlocking 1 or in its module 7 that the track section to be closed can be closed on account of repair and/or maintenance work for example, then the method described above runs fully automatically on the interlocking side.

The procedure is the same when, after conclusion of the repair and/or maintenance work, a track closure revocation signal is to be sent to the interlocking 1 from the track section in order to cancel the closure of the track section.

The invention claimed is:

1. A method for requesting a closure of a track section and a closure revocation, the method comprising:
   providing an expanded interlocking with a module having a chipTAN server;
   optically coupling a monitor of a trackside communication device on the track section with a secure computer chip having a chipTAN generator;
   upon successful coupling between the secure computer chip and the trackside communication device, transmitting a closure signal or a closure revocation signal from the trackside communication device to the expanded interlocking and thereby establishing a communication secured by the interaction between the chipTAN generator coupled to the trackside communication device and the chipTAN server at the expanded interlocking;
   securing the transmitted signals by way of the interaction between the chipTAN generator at the secure computer chip optically coupled to the monitor and the chipTAN server at the expanded interlocking; and
   with the expanded interlocking, upon recognizing the transmitted and secured signals, sending confirmation signals to the secure computer chip confirming a closure of the track section or a closure revocation.

2. An assembly, comprising:
   an interlocking for a track section, the interlocking configured to confirm track section closure signals and closure revocation signals, and the interlocking having a module with a chipTAN server;
   a communication device having a monitor on the track section, said communication device being connected via a communication link to said interlocking for transmitting a closure signal for the track section and a closure revocation signal;
   a secure computer chip having a chipTAN generator and being optically coupled to said monitor by placing said secure computer chip at an electronically marked location of said monitor; and
   wherein said interlocking is configured to recognize the closure signal and the closure revocation signal and to transmit confirmation signals to said secure computer chip.

* * * * *